(12) United States Patent  (10) Patent No.: US 8,161,109 B2
Palmieri  (45) Date of Patent: Apr. 17, 2012

(54) CLIENT SIDE CULLING OF DYNAMIC RESOURCES

(75) Inventor: John Palmieri, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 280 days.

(21) Appl. No.: 12/503,773

(22) Filed: Jul. 15, 2009

(65) Prior Publication Data

US 2011/0016178 A1    Jan. 20, 2011

(51) Int. Cl.
G06F 15/16 (2006.01)
G06F 15/173 (2006.01)

(52) U.S. Cl. ......... 709/204; 709/203; 709/225; 709/226

(58) Field of Classification Search .......... 709/202–204, 709/217, 223–229
See application file for complete search history.

(56) References Cited

U.S. PATENT DOCUMENTS

| | | | | |
|---|---|---|---|---|
| 5,913,033 A * | 6/1999 | Grout | ........................... | 709/219 |
| 6,918,106 B1 * | 7/2005 | Burridge et al. | .............. | 717/100 |
| 7,165,075 B2 * | 1/2007 | Harter et al. | .................. | 707/792 |
| 2005/0216825 A1 * | 9/2005 | Teague | ........................ | 715/501.1 |
| 2006/0248453 A1 * | 11/2006 | Bennett et al. | ................ | 715/513 |
| 2008/0034437 A1 * | 2/2008 | Patterson | ........................ | 726/26 |
| 2008/0256171 A1 * | 10/2008 | Narayanaswami et al. | ... | 709/201 |

* cited by examiner

*Primary Examiner* — Joshua Joo

(74) *Attorney, Agent, or Firm* — Lowenstein Sandler PC

(57) ABSTRACT

A resource management module detect and prevents redundant resources in a client side application. The resource management module is initialized on the client side in a browser or similar application. The resource management module then searches for already executing resources or resources that are already in use. The discovered resources are then compiled and stored in a resource directory. When subsequent pages are loaded the resource management module searches the pages for resources that the page utilizes. The resources are added to the directory if not already present in the resource directory. If the resources are already present in the directory, then the web page being reviewed is modified to remove or replace the multiple resource before being passed on to the browser for loading of resources. In this manner the amount of memory and processing resourced utilized by the client computer can be reduced.

18 Claims, 3 Drawing Sheets

CLIENT SIDE CULLING OF DYNAMIC RESOURCES

BACKGROUND

Embodiments of the present invention relate to a system for detecting loaded resources for a web page and modifying subsequent web pages to avoid re-initialization or reloading of the loaded resources.

Web sites typically provide a number of inter-related pages to present information and interact with a user. These web pages can utilize resources such as JAVASCRIPT®, by Sun Microsystems of Santa Clara, Calif., and cascading style sheets (css) to provide specific functionality or generate content to be displayed to a user. Resources like JAVASCRIPT® and cascading style sheets are interpreted and initialized at the client through a browser application.

Many types of resources are utilized by multiple pages in a web site or across multiple websites. These resources are initialized by a browser or similar client side application upon interpreting the web page as it is received from the web server of the web site. In many cases, the re-use or subsequent use of a resource by another web page or website disrupts an executing instance of the resource. In other cases, the multiple redundant instances of a resource are initialized and executed by separate pages. These problems are addressed or avoided by server side design and programming.

These issues are avoided by carefully programming a web site to avoid multiple initialization calls to any resource that is not idempotent. Similarly, all resource utilized by a website can be specifically designed to be idempotent. These techniques however place additional burdens on programmers by adding additional programming and design complexity. These techniques can also hinder error checking or debugging efforts, because testing of individual pages may not be possible because initialization of a resource requires another page to have already been loaded.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for client side resource management. A resource management module is initialized on the client side in a browser or similar application. The resource management module then searches for already executing resources or resources that are already in use. The discovered resources are then compiled and stored in a resource directory. When subsequent pages are loaded the resource management module searches the pages for resources that the page utilizes. The resources are added to the directory if not already present in the resource directory. If the resources are already present in the directory, then the web page being reviewed is modified to remove or replace the redundant resource before being passed on to the browser for loading of resources. In this manner redundant and error causing code can be removed prior to execution, thereby reducing the amount of memory and processing time utilized by the client computer.

Figure 1:
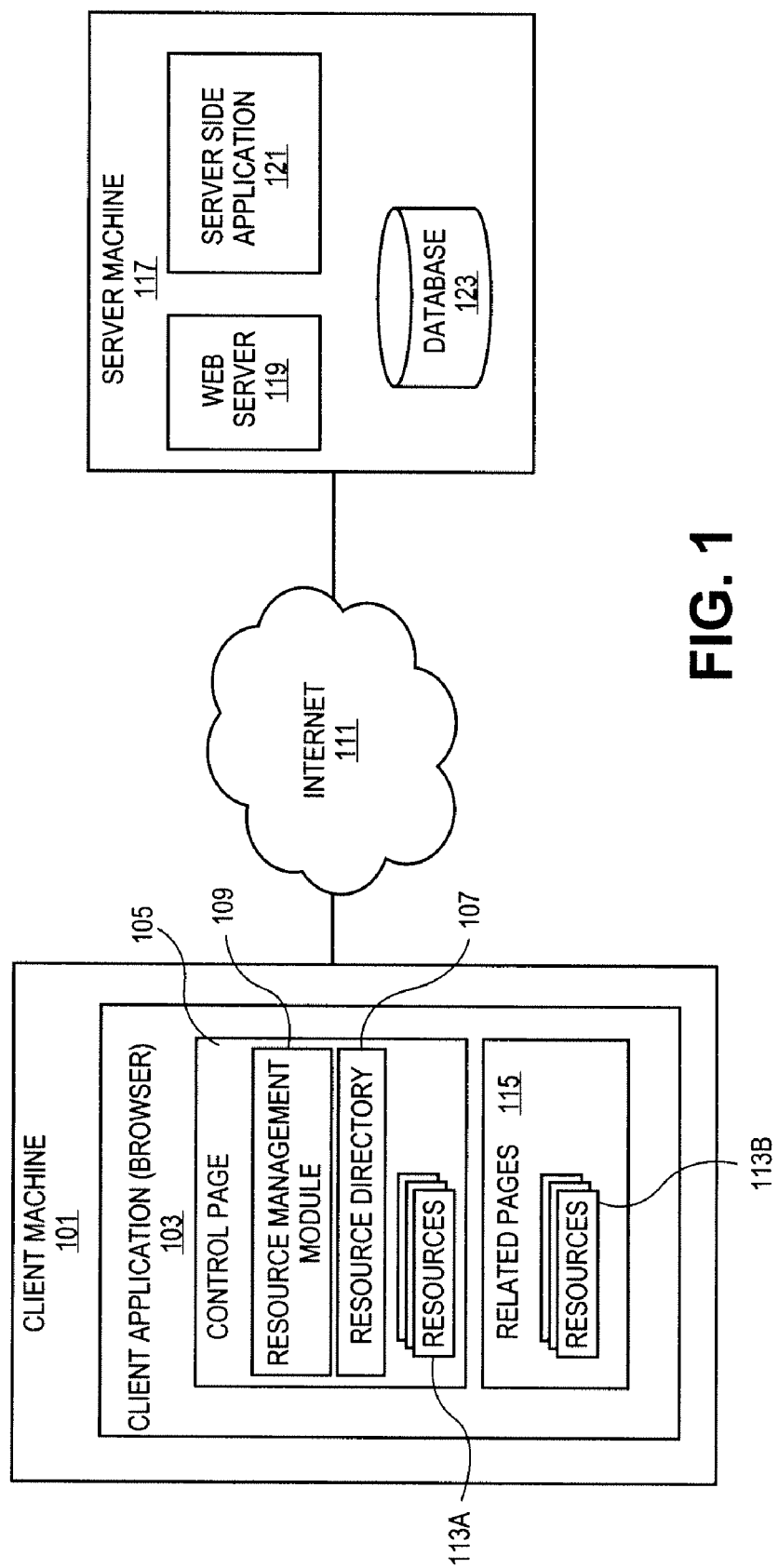
FIG. 1 is a diagram of one embodiment of a system for client side resource management.

FIG. 1 is a diagram of one embodiment of a system including a client side resource management module. The system includes a client machine 101 and server machine 117. The client machine 101 can be any type of computing device including a laptop computer, a handheld computer, a netbook, a desktop, a workstation or similar computing device. The system can include any number of client devices 101 that communicate over a network 111 with any number of server machines 117. A single client machine 101 is illustrated and described for sake of clarity. The network 111 can be any type of communication network including a local area network (LAN), a wide area network (WAN) (e.g., the Internet) or similar communication network. The communication network 111 can include any number of network devices and computing devices that are in communication over any combination of wired and wireless communication lines.

The client machine 101 can execute a set of client applications 103. A 'set,' as used herein refers to any positive whole number of items including a single item. The client application 103 can be any computer executable program capable of communicating with a web server and interpreting the content provided by the web server (e.g., hypertext mark-up language or extensible mark-up language documents). The client application 103 can load and interpret any number of web site pages including a control page 105 and other related pages 115. The client application 103 can be a browser such FIREFOX® by Mozilla Foundation of Mountain View, Calif. or INTERNET EXPLORER® by Microsoft Corporation of Redmond, Wash.

The loaded web pages 105, 115 can include reference or links to a set of resources 113A,B. The resources can be any type of web based or browser based resources including JAVASCRIPT® files, cascading style sheets (css), VBSCRIPT® files, JAVA® files and similar resources that are interpreted or executed on the client side by the client application 103. VBSCRIPT® is by Microsoft Corporation and JAVA® by Sun Microsystems. These resources can include a resource management module 109. The resource management module 109 can be implemented in JAVASCRIPT®, JAVA®, VBSCRIPT® or a similar language. The resources can also include a resource directory 107, which stores a list of resources in use by a web site or set of web pages.

The resource management module 109 searches for in-use resources and resources identified in web pages. The resource management module 109 adds identified resources to the resource directory 107 and modifies web pages prior to execution by a web browser 103 to remove or modify links, tags or similar resource identifiers for already loaded or executing resources that are not idempotent.

A server machine 117 can be any type of computing device including a laptop computer, a handheld computer, a netbook, a desktop, a workstation or similar computing device. The system can include any number of server machines 117 that communicate over a network 111 with any number of client machines 101. A single server machine 117 is illustrated and described for sake of clarity.

The server machine 117 can include a web server 119, server side applications 121, database 123 and similar server side resources. The web server 119 can transmit web pages to the client application 103 and similarly interact with the client application 103 to provide content and interactive interfaces to a user of the client machine 101. The server side applications 121 similarly provide content and functionality to a user of the client side application 103 through the web server 119. The server side application 121 can utilize or provide access to data in databases 123 and similar resources.

Figure 2:
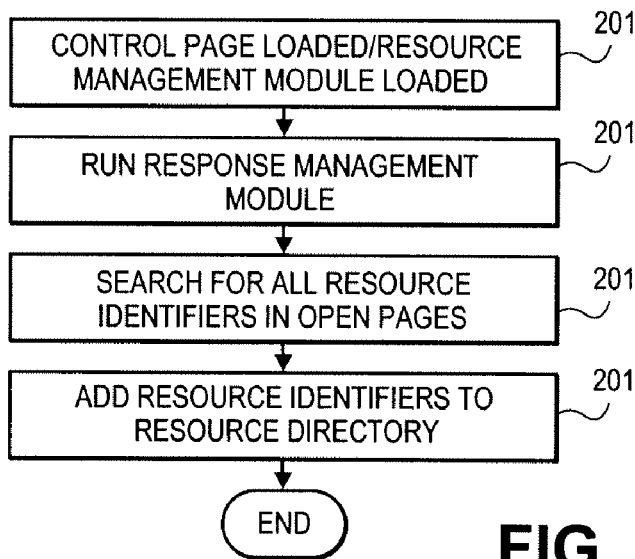
FIG. 2 is a flowchart of one embodiment of a first run of a process for client side resource management.

FIG. 2 is a flowchart of one embodiment of a first run of a process for client side resource management. In one embodiment, the process is initiated in response to loading of resource management module code during the load of a control page or similar web page that references the resource management module file (block 201). The resource management module can be implemented as JAVASCRIPT®, JAVA®, VBSCRIPT® or in a similar language. The resource management module can be loaded as code, object, bytecode or in a similar format.

The loaded resource management module is then executed by a function call (block 203). The resource management module can be executed by a local plug-in or application on the client machine such as a JAVA® virtual machine or code integrated with the browser (block 203). The resource management module can continue to execute while the associated web site is being accessed, until the browser is closed, until a user terminates the execution or until similar circumstances terminate the execution of the module.

After the resource management module has successfully loaded and begun execution, the resource management module begins a search function to identify currently executing or loaded resources (block 205). The search function may search for identifiers (e.g., tags or links to resources) in the code of the control page and other loaded pages. Each of these resources is executing or loaded at the the time of the search. A control page in this context can be a point of entry page reference by a uniform resource locator (URL). Other related pages can be separate pages or pages within the control page.

These identified resources are then recorded in a resource directory (block 207). The identified resources can be recorded in any standardized manner in the resource directory. The identified resources can be recorded based on link or tag information or information about the associated resource that is consistent for each resource such that it can be used as an identifier for that resource when comparing subsequent identifiers to determine whether they are identical. The resource directory can have any format and content sufficient to enable identification of each resource. The resource directory can be a data structure that is generated and and managed by the resource management module or a separate module that interacts with the resource management module to service storage, retrieval and/or comparison requests.

Figure 3:
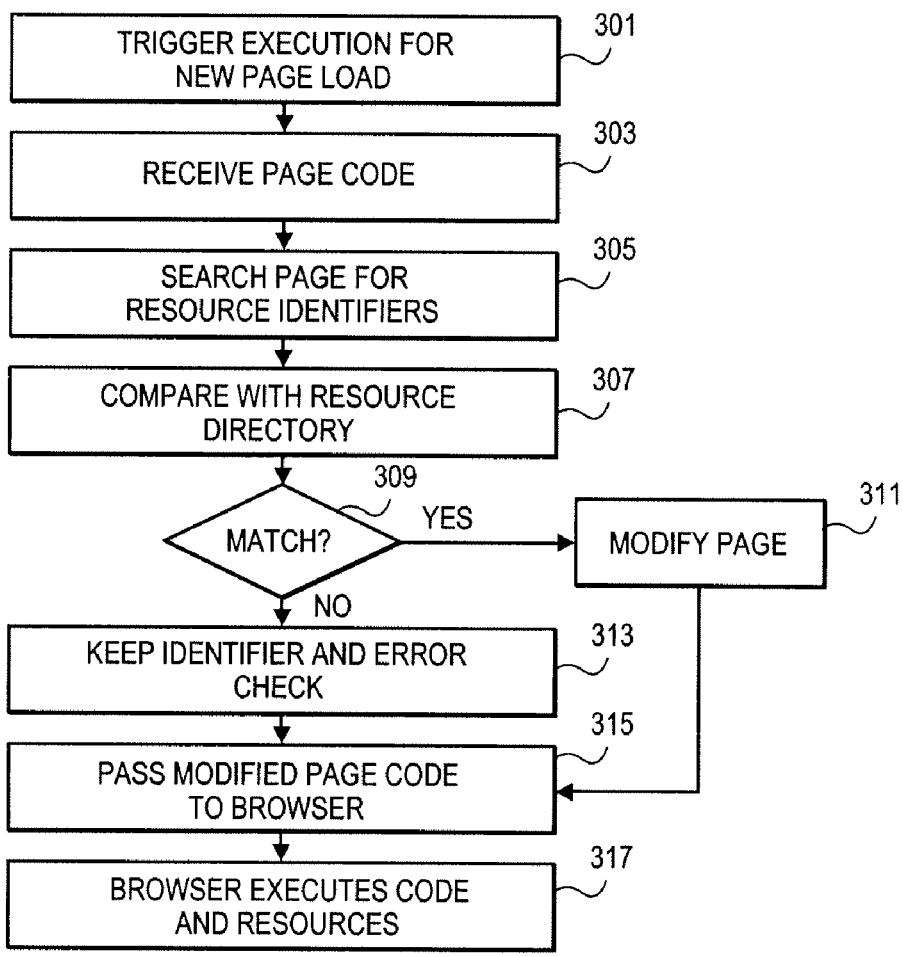
FIG. 3 is a flowchart of one embodiment of a second run of a process for client side resource management.

FIG. 3 is a flowchart of one embodiment of a second or subsequent run of a process for client side resource management. This execution or function of the resource management module can be triggered each time that a new web page is requested or loaded from the web server (block 301). The triggering code can be part of the resource management module or a separate method or function in a module loaded or associated with the control page. The loading of the page from the web server retrieves the web page code (block 303). Received page code can be in hypertext mark-up language, extensible mark-up language or similar formats.

The loaded web page code is passed to the resource management module to be searched for resource identifiers (block 305). The resource identifiers can be any type of resource tag, link or similar identifier within the code. Each resource identifier is compared against the stored resource identifiers in the resource directory (block 307). If a resource identifier is present in the resource directory (block 309), then the resource identifier is deleted or modified in the loaded web page to prevent it from being re-initialized or a second instance being loaded (block 311). The web page can also be modified to reference the already executing or loaded resource.

If the resource identifier is not in the resource directory, then the page is not modified (block 313) and the resource identifier is added to the resource directory (block 315). In some embodiments, the resource management module can also perform some error checking or correction of web pages to avoid issues for that arise from multiple use of a resource. After the entire code is searched and each of the resource identifiers is added to the resource directory or modified in the code then the page is loaded into the domain of the control page or other wise passed back to the browser to complete the loading and interpretation of the web page (block 317). The browser then interprets the web page and loads the resources as it would normally using the web page as modified by the resource management module (block 319).

Figure 4:
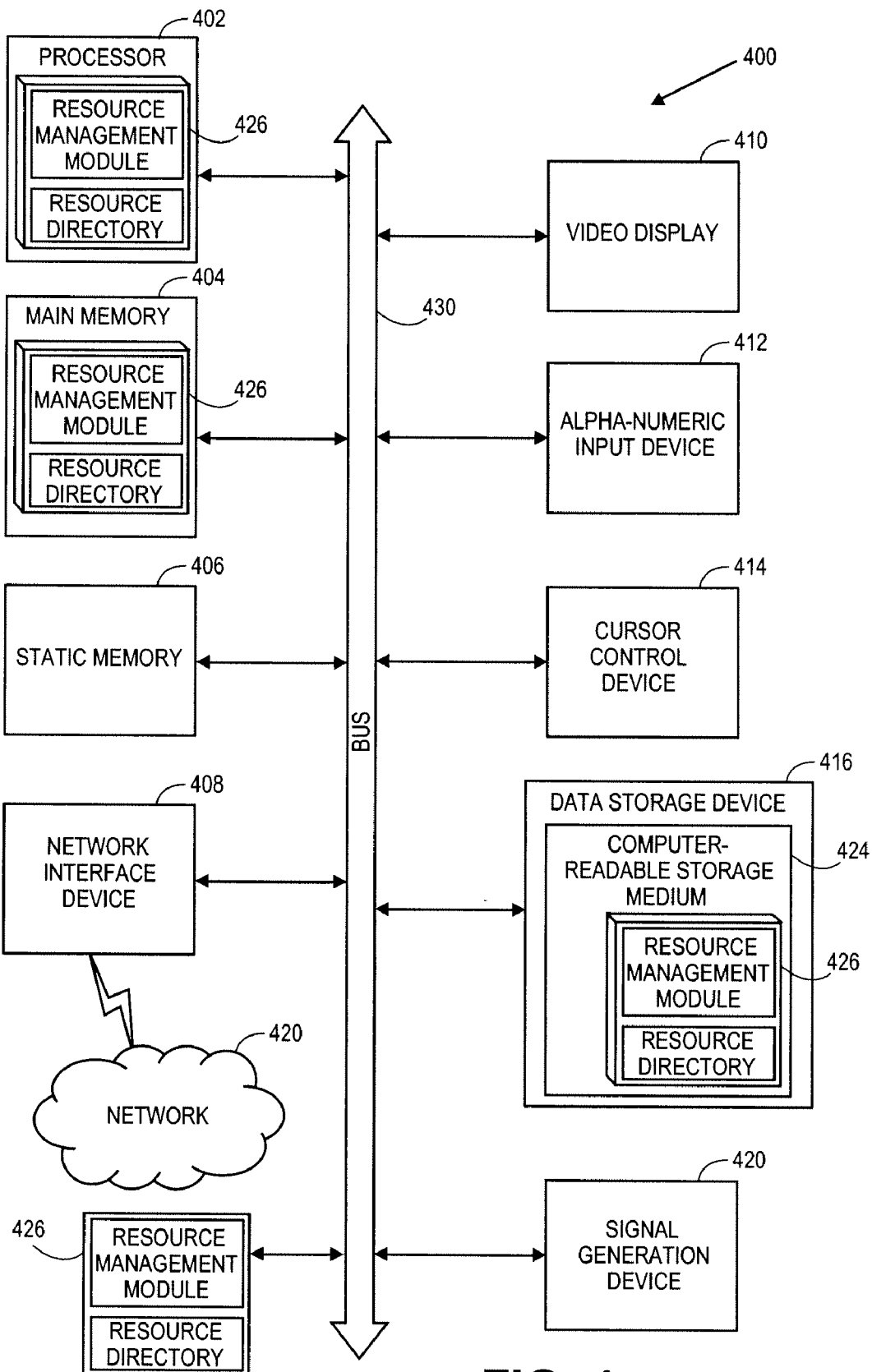
FIG. 4 is a diagram illustrating one embodiment of a system for resource management.

FIG. 4 is a diagram illustrating one embodiment of a system for resource management. Within the computer system 400 is a set of instructions for causing the computer or other machine to perform any one or more of the methodologies discussed herein. In alternative embodiments, the computer system 400 may be connected (e.g., networked) to other machines in a LAN, an intranet, an extranet, or the Internet. The computer system 400 can operate in the capacity of a server or a client machine (e.g., a client computer executing a resource management module and a server computer executing a web server) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computers or other machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 402 may also be one or more special-purpose processing devices such as an application specific integrated circuit (ASIC), a field programmable gate array (FPGA), a digital signal processor (DSP), network processor, or the like. The processing device 402 is configured to execute resource management module and resource directory 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., resource management module or resource directory 426) embodying any one or more of the methodologies or functions described herein. The monitor and correction module 426 may also reside, completely or at least partially, within the main memory 404 and/or within the processing device 502 during execution thereof by the computer system 400, the main memory 404 and the processing device 402 also constituting machine-readable storage media. The resource management module and resource directory 426 may further be transmitted or received over a network 418 via the network interface device 422.

The machine-readable storage medium 424 may also be used to store the monitor and correction module 426 persistently. While the machine-readable storage medium 426 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "detecting," "executing," "analyzing," "reversing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in microcoded hardware components.

Thus, a method and apparatus for client side resource management has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:

identifying a first resource identifier in a first web page, wherein the first resource identifier represents a first browser-based resource on a client machine and to be loaded by the client machine;

recording, by the client machine, the first resource identifier in a resource directory, wherein the resource directory is to store a set of one or more resource identifiers that represent resources that are already in use by a browser on the client machine;

receiving a second web page subsequent to the first web page;
identifying the first resource identifier in the second web page as one of the set of resources that are already in use by the browser on the client machine; and
modifying, by a resource module of the client machine, the second web page by removing or modify the first resource identifier in the second web page to prevent the first browser-based resource from being re-initialized or a second instance of the first browser-based resource from being loaded from the client machine.

2. The computer-implemented method of claim 1, further comprising passing the modified second web page to the browser on the client machine.

3. The computer-implemented method of claim 1, further comprising:
identifying a second resource in the first web page; and
recording the second resource in the resource directory.

4. The computer-implemented method of claim 1, further comprising searching code of the first web page for the first resource identifier.

5. The computer-implemented method of claim 1, further comprising comparing the first resource identifier to a resource directory entry to determine a match.

6. The computer-implemented method of claim 1, further comprising triggering a search of the second web page for resource identifiers corresponding to the set of one or more resources that are already in use by the client machine.

7. The computer-implemented method of claim 1, wherein the first resource identifier is a tag or link.

8. A non-transitory computer readable storage medium, having instructions stored therein, which when executed, cause a computer to perform a set of operations comprising:
identifying a first resource identifier in a first web page, wherein the first resource identifier represents a first browser-based resource on the computer and to be loaded by the computer;
recording, by the computer, the first resource identifier in a resource directory, wherein the resource directory is to store a set of one or more identifiers that represent resources that are already in use by a browser on the computer;
receiving a second web page subsequent to the first web page;
identifying the first resource identifier in the second web page as one of the resources that are already in use by the browser on the computer; and
modifying, by a resource module of the computer, the second web page by removing or modify the first resource identifier in the second web page to prevent the first browser-based resource from being re-initialized or a second instance of the first browser-based resource from being loaded from the computer.

9. The computer readable storage medium of claim 8, having further instructions therein, which when executed, cause the computer to perform a further set of operations, further comprising passing the modified second web page to the browser on the computer.

10. The computer readable storage medium of claim 8, having further instructions therein, which when executed, cause the computer to perform a further set of operations, further comprising:
identifying a second resource in the first web page; and
recording the second resource in the resource directory.

11. The computer readable storage medium of claim 8, having further instructions therein, which when executed, cause the computer to perform a further set of operations, further comprising searching code of the first web page for the first resource identifier.

12. The computer readable storage medium of claim 8, having further instructions therein, which when executed, cause the computer to perform a further set of operations, further comprising comparing the first resource identifier to a resource directory entry to determine a match.

13. The computer readable storage medium of claim 8, having further instructions therein, which when executed, cause the computer to perform a further set of operations, further comprising triggering a search of the second web page for resource identifiers corresponding to the set of one or more resources that are already in use by the computer.

14. The computer readable storage medium of claim 8, wherein the first resource identifier is a tag or link.

15. An apparatus comprising:
a client machine to execute a resource management module, the resource management module to identify a first resource identifier in a first web page, wherein the first resource identifier represents a first browser-based resource on the client machine and to be loaded by the client machine, wherein the resource management module is to identify the first resource identifier in a second web page as one of a set of resources that are already in use by a browser on the client machine, wherein the resource management module is to modify the second web page by removing or modifying the first resource identifier in the second web page to prevent the first browser-based resource from being re-initialized or a second instance of the first browser-based resource from being loaded from the client machine; and
a storage device coupled to the client machine, the storage device to store a resource directory to store resource identifiers detected by the resource management module in the storage device, wherein the resource identifiers stored in the resource directory correspond to the set of resources that are already in use by the browser on the client machine.

16. The apparatus of claim 15, wherein the resource management module is configured to search the second web page for the first resource identifier.

17. The apparatus of claim 15, wherein the resource management module is configured to pass the modified second web page to the browser.

18. The apparatus of claim 15, wherein the resource management module is configured to trigger a search of the second web page.

* * * * *